United States Patent [19]
Hiratsuka et al.

[11] 3,857,778
[45] Dec. 31, 1974

[54] METHOD OF RENDERING ELECTROPHORESIS MEMBRANE TRANSPARENT

[75] Inventors: Nobuo Hiratsuka; Kiyotaka Shimoda, both of Ashirgara-machi, Ashigara-Kamigun, Kanagawa, Japan

[73] Assignee: Fuji Photo Film Co., Ltd., Kanagawa, Japan

[22] Filed: Nov. 3, 1971

[21] Appl. No.: 195,420

[30] Foreign Application Priority Data
Nov. 4, 1970 Japan.............................. 45-96404

[52] U.S. Cl................ 204/299 R, 106/196, 117/62, 117/144.5, 204/180 S, 260/227, 260/230
[51] Int. Cl.............................................. B01k 5/00
[58] Field of Search .......... 117/6.2, 62.1, 62.2, 144, 117/144.5; 260/223, 230 R; 264/41, 49; 204/296, 301, 180 S, 299 R

[56] References Cited
UNITED STATES PATENTS

| | | | |
|---|---|---|---|
| 3,230,212 | 1/1966 | Rice | 260/223 |
| 3,373,056 | 3/1968 | Martin | 117/144 |
| 3,432,424 | 3/1969 | Zec | 204/299 R |
| 3,497,437 | 2/1970 | Louderback et al. | 204/299 X |
| 3,553,067 | 1/1971 | Dwyer et al. | 204/180 X |
| 3,557,083 | 1/1971 | Sacco | 260/230 |
| 3,594,263 | 7/1971 | Dwyer et al. | 204/180 X |

*Primary Examiner*—Michael R. Lusignan
*Attorney, Agent, or Firm*—Sughrue, Rothwell, Mion, Zinn & MacPeak

[57] ABSTRACT

The present invention renders an electrophoretic membrane having a molecular weight range from 10,000 to 150,000 transparent by first impregnating the membrane with a lower alkyl alcohol and thereafter treating the membrane with an ether until the membrane becomes transparent. The temperature of the solvent liquids generally ranges from 10° to 35° C.

9 Claims, 2 Drawing Figures

METHOD OF RENDERING ELECTROPHORESIS MEMBRANE TRANSPARENT

BACKGROUND OF THE INVENTION

1. Field of the Invention

The present invention relates to a method of rendering an electrophoresis membrane transparent for use, for example, in the analysis of serum protein.

2. Description of the Prior Art

When partition quantitative analysis of serum protein is electrophoretically conducted with a cellulose resin electrophoretic membrane and the density of the dyed image formed on the electrophoretic membrane is to be measured by a densitometer, the measurement can not be conducted accurately if the electrophoretic membrane is opaque. Accordingly, the measurement of the density has hitherto been conducted after rendering the electrophoretic membrane transparent by filling the pores of the membrane with a liquid having the same refractive index as that of the electrophoretic membrane, such as liquid paraffin or decalin.

However, in making an electrophoretic membrane transparent by treatment with a liquid paraffin or decalin, the membrane must be completely dried to completely eliminate water contained in the membrane. If the membrane is insufficiently dried, water remains in the pores of the membrane and hence, the liquid paraffin or decalin does not enter the pores of the membrane. In other words, if the membrane is insufficiently dried, the membrane does not become uniformly transparent and hence, the density measurement is not accurate.

Furthermore, the surface of an electrophoretic membrane bearing a liquid paraffin or decalin is sticky, which can result in dirtying the operator's hands, clothes and documents and makes handling inconvenient as well as making storage difficult.

The use of glacial acetic acid as such a "transparency" liquid has also been proposed but its odor is severe and hence, operations with the liquid are difficult.

SUMMARY OF THE INVENTION

The electrophoresis membrane of the present invention can be used for the analysis of serum protein. Alcohol is used in the first treatment step since it effects the deformation of protein during the analysis of the samples and helps prevent any separation from the glass plate and further improves the ease of handling.

In the present invention, for example, an organic solvent, such as acid solvent (acetic acid) may be used and alcohol solvent is particularly preferred.

Ether is used in the subsequent second treatment step since it has the effect of making the membrane transparent without deforming the protein, and an ether solvent, such as dioxane, ethylene oxide, diethyl ether, methyl ethyl ether, diethyl dioxane or a mixture thereof can be utilized.

The sequence of the first and second treatments steps can not be reversed. If the sequence is reversed, the electrophoresis membrane will not become completely transparent and the membrane will tend to deform.

The method of this invention has such merits that even if an electrophoretic membrane is not completely dried (contains some water in its pores) the membrane will become completely transparent without any uneven transparency. Since the electrophoretic membrane is in a dry state at the treatment of making it transparent, it does not spoil the user's hands, clothes, etc., and the handling of such a membrane is easy. Finally, because a sticky liquid such as liquid paraffin or decalin is not used, the density measurement is greatly improved.

DESCRIPTION OF THE PREFERRED EMBODIMENT

Figure 1:
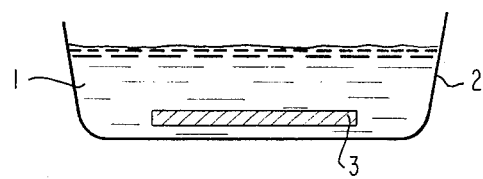
FIG. 1 is a cross-sectional view showing a electrophoretic membrane immersed in the first treating liquid in accordance with this invention.
Figure 2:
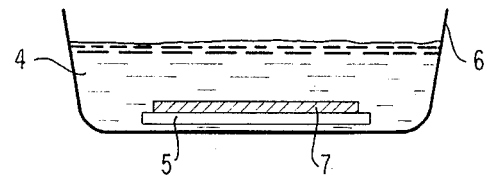
FIG. 2 is a cross-sectional view showing an electrophoretic membrane immersed in the second treating liquid in accordance with this invention.

In the method of this invention, an electrophoretic membrane 3 subjected to analysis and decoloring according to the standard operation method of the Establishment of the Electrophoresis Society (1966) is treated by immersing it in an alcoholic solvent 1 which is the first treating liquid shown in FIG. 1. The membrane 3 after withdrawal from the first treating liquid is placed on a support 5, such as a glass sheet, and is placed in the second treating solution 2, which is an ether solvent, as shown in FIG. 2. When the membrane becomes transparent, the membrane is withdrawn from the second liquid and dried, e.g., in a horizontal position, to provide a transparent membrane, which can be readily separated from the support, e.g., a glass sheet.

The alcoholic solvent used in this invention as the first treating liquid is a primary lower alkyl alcohol having 1–12 carbon atoms, preferably 1–5 atoms such as methyl alcohol, ethyl alcohol, butyl alcohol, or mixtures thereof. The ether solvent used in this invention as the second treating liquid can be dioxane, ethylene oxide, diethyl ether, methyl ethyl ether, diethyl dioxane or mixtures thereof are employed.

Examples of electrophoretic membranes that can be used in the method of this invention are cellulose acetate membranes, nitrocellulose membranes, cellulose diacetate, cellulose triacetate and the like as shown in U.S. Pat. Nos. 3,520,874, 3,129,159 and 3,567,809.

Those plastic films which are soluble with the alcohols and ethers to form a porous membrane are operable. Their molecular weight range is 10,000 – 150,000, and preferably, between 70,000 and 90,000.

The electrophoresis membrane is immersed in the first treating liquid for a period of time sufficient to impregnate the membrane with the liquid. Usually, the time is more than 30 seconds and is generally 2–3 minutes, though one skilled in the art will appreciate that shorter and longer times can be used. The membrane withdrawn from the first treating liquid is immersed in the second treating liquid for a set period of time until the transparency of the membrane is confirmed by the naked eye, the time usually being about 3 to 5 minutes, though one skilled in the art will readily appreciate this time may vary.

The invention will now be explained by the following examples.

EXAMPLE 1

An electrophoretic membrane subjected to the analysis and decoloring treatment according to the standard operation method described before was immersed in ethyl alcohol for 1 minute to impregnate the membrane with ethyl alcohol. The membrane was then withdrawn from the ethyl alcohol and placed on a glass sheet under pressure so that air did not enter the pores of the membrane. The glass sheet and membrane were immersed in dioxane for 3–5 minutes, whereby the membrane became transparent. The membrane was then withdrawn from the dioxane and dried for 5 minutes at 60° C., whereby a stable transparent membrane was obtained.

EXAMPLE 2

An electrophoretic membrane subjected to the analysis and decoloring treatment according to the standard operation method was immersed in methyl alcohol for 2 minutes so that the membrane was sufficiently impregnated with methyl alcohol. Then, the membrane was withdrawn from the methyl alcohol, placed on a glass sheet so that air did not enter the pores of the membrane, and both were immersed in diethyl ether for 15 minutes, whereby the membrane became transparent. The membrane was then withdrawn from the diethyl ether and dried for 15 minutes at 80° C. to provide a stable transparent membrane.

The composition of membrane used in Examples 1 and 2 are as follows:

| | |
|---|---|
| Cellulose triacetate | 44 wt% |
| Cellulose diacetate | 54 wt% |
| Triacetin(glyceryl triacetate) | 2 wt% |

And they were produced according to the U.S. Pat. No. 3,567,809.

The temperature range for the first and second treatments is generally between 10° and 35° C. and preferably, between 20° and 30°C. Generally, outside this range of temperatures the membrane will become cloudy and brushing occurs due to the water contacting the air.

What is claimed is:

1. A method of rendering a cellulose ester electrophoretic membrane transparent comprising the steps of:
   immersing the membrane in an alcohol solution to impregnate said membrane,
   withdrawing the impregnated membrane from said alcohol,
   placing the impregnated membrane on a support, thereby excluding air from the pores of said membrane,
   immersing the supported alcohol-impregnated membrane in an ether and,
   removing and drying the membrane.

2. A method as in claim 1, where the alcohol is a primary lower alkyl alcohol.

3. A method as in claim 2, wherein the ether is selected from the group consisting of dioxane, ethylene oxide, diethyl ether, methyl ethyl ether, diethyl dioxane and mixtures of said ethers.

4. A method as in claim 3, wherein the alcohol is selected from the group consisting of methyl alcohol, ethyl alcohol, butyl alcohol and mixtures of said alcohols.

5. A method as in claim 4, wherein the membrane is immersed in the alcohol for between 2 to 3 minutes.

6. A method as in claim 5, wherein the alcohol-impregnated membrane is immersed in the ether for between 3 to 5 minutes.

7. A method as in claim 5, wherein the membrane is cellulose triacetate.

8. A method as in claim 5, where the temperature range of the alcohol and ether is maintained between 10° and 35° C.

9. A method as in claim 5, where the membrane comprises cellulose triacetate, cellulose diacetate and glyceryl triacetate.

* * * * *